(12) United States Patent
Yoo et al.

(10) Patent No.: US 6,779,041 B1
(45) Date of Patent: Aug. 17, 2004

(54) APPARATUS AND METHOD FOR STREAMING MPEG-1 DATA

(75) Inventors: Hyuck Yoo, San Jose, CA (US); Jin-Hwan Jeong, Seoul (KR)

(73) Assignee: Thin Multimedia, Inc., Palo Alto, CA (US)

(*) Notice: Subject to any disclaimer, the term of this patent is extended or adjusted under 35 U.S.C. 154(b) by 0 days.

(21) Appl. No.: 09/575,494

(22) Filed: May 18, 2000

(30) Foreign Application Priority Data

May 21, 1999 (KR) .................................. 10-1999-0018490

(51) Int. Cl.[7] .............................................. G06F 15/16
(52) U.S. Cl. ...................... 709/247; 348/512; 348/515; 375/240.28
(58) Field of Search .............................. 725/78, 80, 82, 725/85; 375/240.25, 240.26, 240.28; 348/512, 513, 515; 709/236, 246, 247; H04N 7/18, 7/12, 9/475; G06F 15/16

(56) References Cited

U.S. PATENT DOCUMENTS 6,148,135 A * 11/2000 Suzuki ........................ 386/12

6,337,883 B1 * 1/2002 Tanaka ................... 375/240.25

* cited by examiner

Primary Examiner—Vivek Srivastava
Assistant Examiner—Joseph G. Ustaris
(74) Attorney, Agent, or Firm—Townsend and Townsend and Crew LLP (57) ABSTRACT

There is provided an apparatus and method for streaming MPEG-1 data in which, when the MPEG-1 data is transmitted through the network, the MPEG-1 data is converted into intermediate data, a server transfers the intermediate data in the form of packet with synchronizing video intermediate data and audio intermediate data with each other, thereby allowing a client to be able to receive and process the intermediate data with a simple conversion. The apparatus includes: an MPEG-1 system stream decoder for decoding the system stream of an MPEG-1 file; a YUV data generator for converting a videos stream transmitted from the MPEG-1 system stream decoder into YUV data as intermediate data; a PCM data generator for converting an audio stream transmitted from the MPEG-1 system stream decoder into PCM data; and an MPEG-1 intermediate data server for synchronizing the YUV data and PCM data, respectively generated by the YUV data generator and PCM data generator, with a YUV PTS and PCM PTS obtained from the MPEG-1 system stream decoder and a system clock, to transmit them to the client.

9 Claims, 11 Drawing Sheets

| Constant | basic value | unit | description |
|---|---|---|---|
| ETH_SPEED | 100 | Mbit/s | Ethernet speed |
| MTU | --- | byte | Maximum Transmission Unit |
| Q | 10 | ms | Time Quantum of operating system |
| SCF | 90 | KHz | System clock frequency |
| SCF2 | 45 | KHz | Convert SCF into 32bit |
| SCR2MS | 1/45 | ms | Convert PTS into thousandth ms/SCF2 |
| NS2SCR | 1/22222 | SCR | Convert $10^{-9}$ seconds into SCR value ns/(SCF2*1000/2) |
| V_FPS | --- | Frame/s | MPEG video frame rate |
| V_SPF | 1000/V_FPS | ms | Time interval of one MPEG frame |
| V_SAM | 4:2:0 | | MPEG video subsampling |
| V_PIX | 12 | bit/pixel | 8bit/byte*3/2(4:2:0 Subsampling) |
| V_DIM | --- | Pixel | MPEG frame breadth*MPEG frame length |
| V_BIT | --- | bit | MPEG frame size V_DIM*V_PIX |
| V_DPF | --- | ms | Time required for streaming one frame to network (V_BIT/ETH_SPEED)*(1000ms/s)(1024*1024) |
| V_BNS | --- | ns | Time at which decoding starts |
| $T_1$ | 250/SCR2MS | ms | Value for deciding if next frame is transformed or dropped before video intermediate data conversion |
| $T_2$ | 250/SCR2MS | ms | Value for deciding if next frame is transformed or dropped before video intermediate data stream |
| A_FRE | 48 | KHz | Audio frequency |
| A_SAM | 1152 | --- | number of sample of one audio frame |
| A_SPF | --- | ms | A_SAM/A_FRE*(1000ms/s) |

FIG. 11

APPARATUS AND METHOD FOR STREAMING MPEG-1 DATA

CROSS-REFERENCES TO RELATED APPLICATIONS

This application claims priority to Korean Application No. 99-18490 filed May 21, 1999, incorporated by reference herein.

BACKGROUND OF THE INVENTION

1. Field of the Invention

The present invention relates to streaming of MPEG-1 data through a network. Particularly, it relates to an apparatus and method for streaming MPEG-1 data in which, when the MPEG-1 data is transmitted on the network, the MPEG-1 data is converted into intermediate data, a server transfers the intermediate data in the form of packet with synchronizing video intermediate data and audio intermediate data with each other, thereby allowing a client to be able to receive and process the intermediate data through a simple conversion.

2. Discussion of Related Art

In streaming of MPEG-1 data (video data and audio data) through a network, in general, a transmitting side transmits the MPEG-1 data in the form of packet using corresponding protocol with regard to a limited data streaming rate and amount of streaming data of the network. A receiving side includes an additional apparatus for receiving the MPEG-1 data in the form of packet and an apparatus for decompressing the compressed MPEG-1 data to receive and process the MPEG-1 data transmitted.

That is, a system for streaming the MPEG-1 data through the network consists of the server and client. The server stores a large amount of MPEG-1 data at a data storage thereof and, when the client requests specific data, extracts the corresponding MPEG-1 data to transfer it to the client. Accordingly, the client needs an additional decoding apparatus for decoding the MPEG-1 data to process it. This complicates the configuration of the client computer. Further, the client should synchronize the video data and audio data with each other, brining about complexity due to the synchronization. Moreover, the client side requires a high-speed central processing unit to decode the MPEG-1 data, resulting in difficulty in realization of its hardware and increase in product cost.

SUMMARY OF THE INVENTION

Accordingly, the present invention is directed to an apparatus and method for streaming MPEG-1 data that substantially obviates one or more of the problems due to limitations and disadvantages of the related art.

An object of the present invention is to provide an apparatus and method for streaming MPEG-1 data in which, when the MPEG-1 data is transmitted through a network, the MPEG-1 data are converted into intermediate data, a server transfers the intermediate data in the form of packet with synchronizing video intermediate data and audio intermediate data with each other, thereby allowing a client to be able to receive and process the intermediate data through a simple conversion.

In order to achieve the above object of the present invention, the server transmits intermediate data (YUV, PCM) to the network in view of synchronization of video data and audio data so that the synchronization between the video (YUV) data and audio (PCM) data is achieved at the client side only by sequentially processing the intermediate data entering the network.

Further, the server uses a PTS (Present Time Stamp) placed at a system stream part of the MPEG-1 file for the synchronization of the video data and audio data. Specifically, the video data and audio data are compressed into a video stream and audio stream, respectively, in MPEG-1 and synchronized according to the PTS of the system stream. Accordingly, the server uses this PTS to synchronize YUV (Y indicates luminance signal and U and V indicate color difference signals) and PCM (pulse coded modulation data corresponding to a voice signal), respectively outputted from a video decoder and audio decoder, with each other, and transmits them to the network.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the drawings: In the drawings.

DESCRIPTION OF THE SPECIFIC EMBODIMENTS

Reference will now be made in detail to the preferred embodiments of the present invention, examples of which are illustrated in the accompanying drawings.

Figure 1:
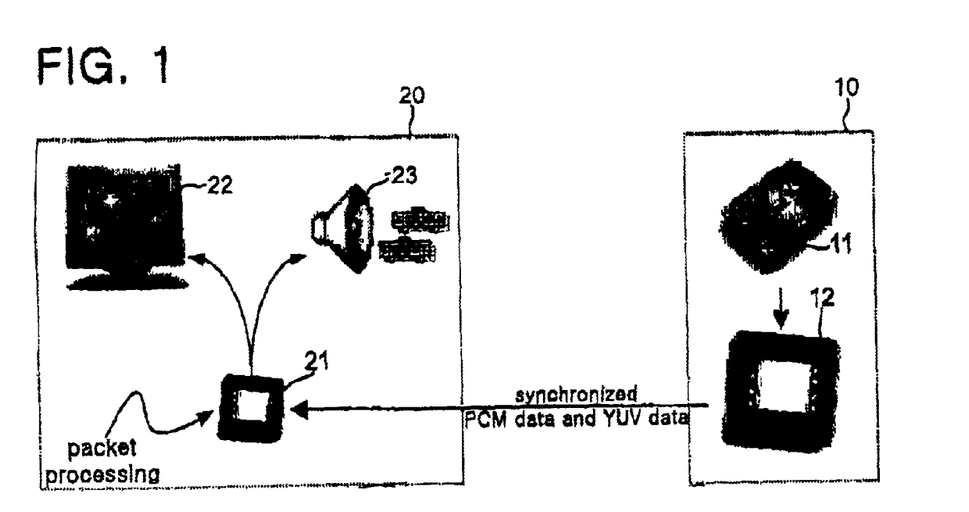
FIG. 1 illustrates the configuration of a network for streaming MPEG-1 data according to the present invention.

FIG. 1 roughly illustrates the configuration of a network system to which the present invention is applied. The network system is classified into a server 10 and a client 20. Server 10 stores compressed MPEG-1 files at a data storage 11 thereof. An intermediate data generator 12 of server 10 converts the compressed MPEG-1 files stored at data storage 11 into YUV data and PCM data to transmit them to the network. Here, server 10 converts video data and audio data among the compressed. MPEG-1 files into the YUV data and PCM data, respectively, synchronizes them with each other using the PTS of a system stream, and then transmits them to the network, thereby providing them to the client.

Client 20 receives and processes in real time a packet including the YUV data and PCM data transmitted through the network at a packet processing apparatus 21 thereof. The processed video signal is sent to a video outputting unit 22 to be outputted while the processed audio signal is delivered to an audio outputting unit 23 to be outputted. That is, packet processing apparatus 21 can process the YUV data and PCM data received in real time through a simple transformation (for example, scaling, RGB conversion, analog 20 audio conversion), because the packet data transmitted through the network correspond to the YUV video data and PCM audio data which have undergone decompression partly and synchronization.

The PTS is time management information of reproduction output. When the STC (System Time Clock: basic synchronous signal) inside a reference demodulator of an MPEG-1 system coincides with the PTS, a corresponding access unit is reproduced. The resolution of PTS indicates a value measured by 90 Khz clock as 33-bit length. To obtain a resolution higher than one sample cycle of audio data, 90 Khz is used which is a common multiple of the frame frequency of both of the NTSC and PAL video modes. Further, 33-bit length is used in order to represent the range of 24 hours a day with the measured value at the 90 Khz clock, similarly to SMPTE (Society of Motion Picture and Television Engineers).

Figure 2:
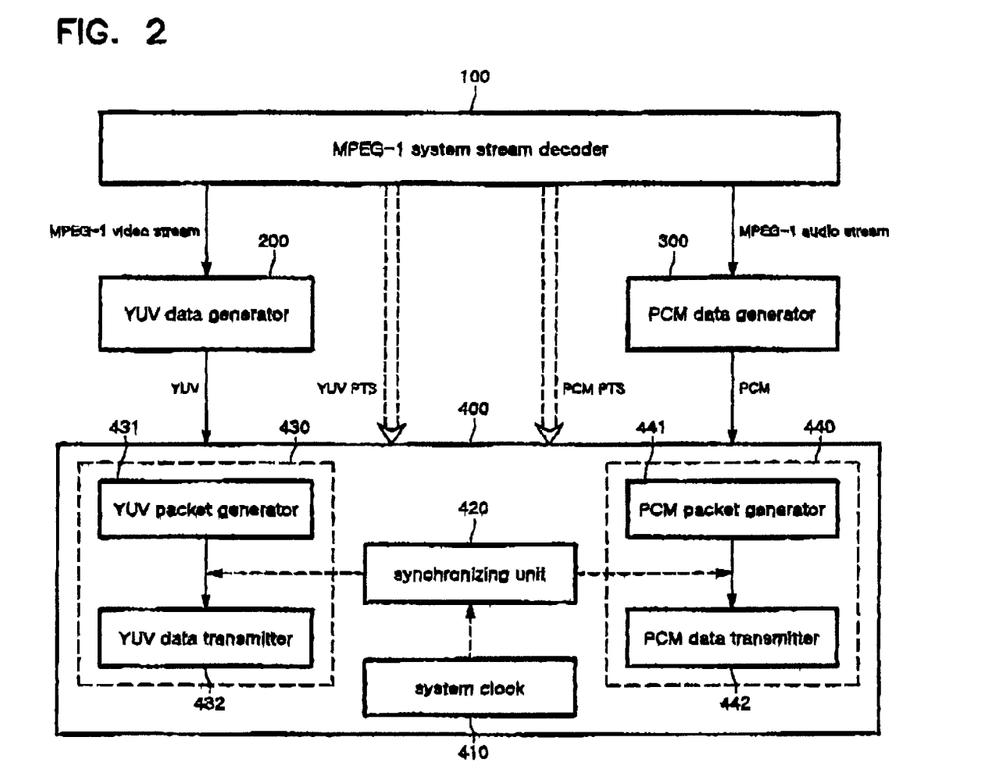
FIG. 2 is a block diagram of an MPEG-1 data streaming apparatus according to the present invention.

FIG. 2 is a block diagram of an MPEG-1 data streaming apparatus according to the present invention. Referring to FIG. 2, the apparatus includes an MPEG-1 system stream decoder 100 for decoding the system stream of MPEG-1 files, a YUV data generator 200 for converting a video stream transmitted from MPEG-1 system stream decoder 100 into YUV data as intermediate data, a PCM data generator 300 for converting an audio stream transmitted from MPEG-1 system stream decoder 100 into PCM data, and a server 400 synchronizing the YUV data and PCM data respectively generated by YUV data generator 200 and PCM data generator 300 with a YUV PTS and PCM PTS generated by MPEG-1 system stream decoder 100 and a system clock and transmitting them to a client.

MPEG-1 intermediate data server 400 is composed of a system clock 410 for providing system time ST, a synchronizing section 420 for controlling synchronization between the system time generated by system clock 410 and YUV and PCM packets generated by the YUV PTS and PCM PTS obtained from MPEG-1 system stream decoder 100, a YUV data transmitter 430 for packetizing the YUV intermediate data generated by YUV data generator 200 and synchronizing it under the control of synchronizing section 420 to transmit it, and a PCM data transmitter 440 for packetizing the PCM data generated by PCM data generator 300 and synchronizing it under the control of synchronizing section 420 to transmit it.

In the MPEG-1 data streaming apparatus of the present invention as constructed above, MPEG-1 files from MPEG-1 system stream decoder 100 reads the MPEG-1 files and provides the YUV PTS and PCM PTS to MPEG-1 intermediate data server 400. MPEG-1 system stream decoder 100 also generates the video stream and audio stream, and delivers the generated MPEG-1 video stream and audio stream to YUV data generator 200 and PCM data generator, respectively. YUV data generator 200 converts the video stream sent from MPEG-1 system stream decoder 100 into the YUV data as intermediate data to transmit it to MPEG-1 intermediate data server 400 while PCM data generator 300 converts the audio stream sent from MPEG-1 system stream decoder 100 into the PCM data to transfer it to MPEG-1 intermediate data server 400. Then, MPEG-1 intermediate data server 400 synchronizes the YUV data and PCM data respectively delivered from YUV data generator 200 and PCM data generator 300 with the YUV PTS and PCM PTS provided by MPEG-1 system stream decoder 100 and system time ST supplied from system clock 410, to transmit them to the client. This is described below in more detail.

MPEG-1 intermediate data server 400 controls synchronization of a UV packet generated by a YUV packet generator 431 with system time ST obtained by system clock 410 and the YUV PTS generated by MPEG-1 system stream decoder 100. This YUV packet whose video synchronization has been controlled is transmitted from a YUV data transmitter 432 to the client. MPEG-1 intermediate data server 400 also controls synchronization of a PCM packet generated by a PCM packet generator 441 with system time ST obtained by system clock 410 and the PCM PTS generated by MPEG-1 system stream decoder 100. This PCM packet whose audio synchronization has been controlled is transmitted from a PCM data transmitted 442 to the client.

Figure 10:
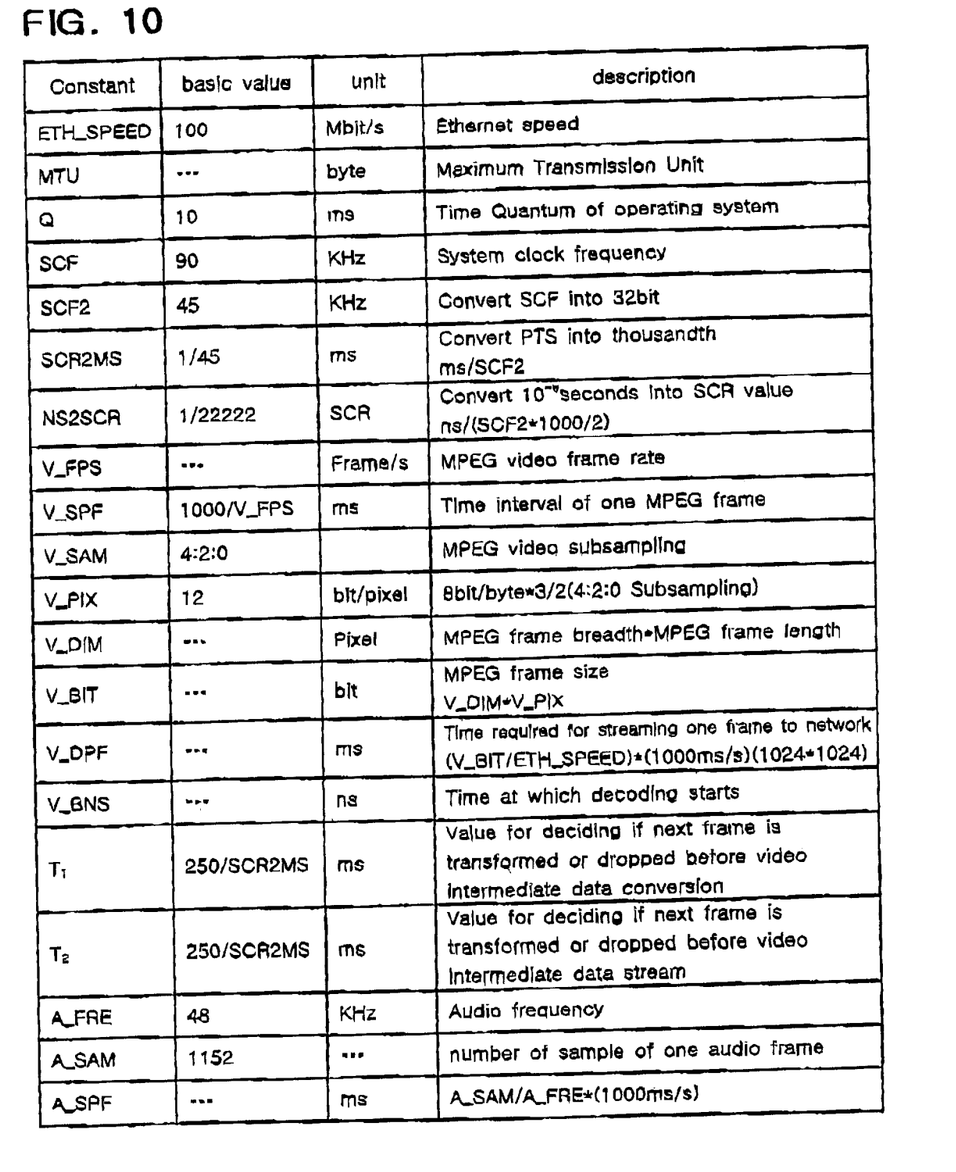
FIG. 10 is a table describing the meanings of constants applied to the present invention.

FIG. 10 is a table for explaining functions applied to the MPEG-1 data streaming apparatus and method according to the present invention. In this table, ETH_SPEED indicates the speed of a network transmitting apparatus, MTU means maximum transmission unit, and Q indicates time quantum of operating system. Further, SCF means system clock frequency, SCF2 indicates a version of SCF transformed by 32 bits, SCR2MS a version of PTS transformed by thousandth seconds, V_FPS the MPEG-1 video frame rate, and V_SPF time interval of one MPEG-1 frame. V_SAM represents MPEG-1 video sub-sampling form, V_PIX indicates 8 bits/byte*3/2, i.e., 4:2:0 sub-sampling. V_DIM represents MPEG-1 frame breadth*MPEG-1 frame length, and V_BIT indicates the size of MPEG-1 frame (V_DIM*V_PIX). In addition, V_DPF means the period of time required for one frame to be transmitted to a network, and V_BNS indicates decoding start time. Further, T1 corresponds to a reference value for deciding if the next frame is transformed or dropped before video intermediate data conversion, and T2 corresponds to a reference value for deciding if the next frame is transmitted or dropped before video intermediate data streaming. A_FRE indicates the audio frequency, A_SAM represents the number of sample of one audio frame, and A_SPF corresponds to A_SAM/A_FRE*(1000 m/s).

Figure 3:
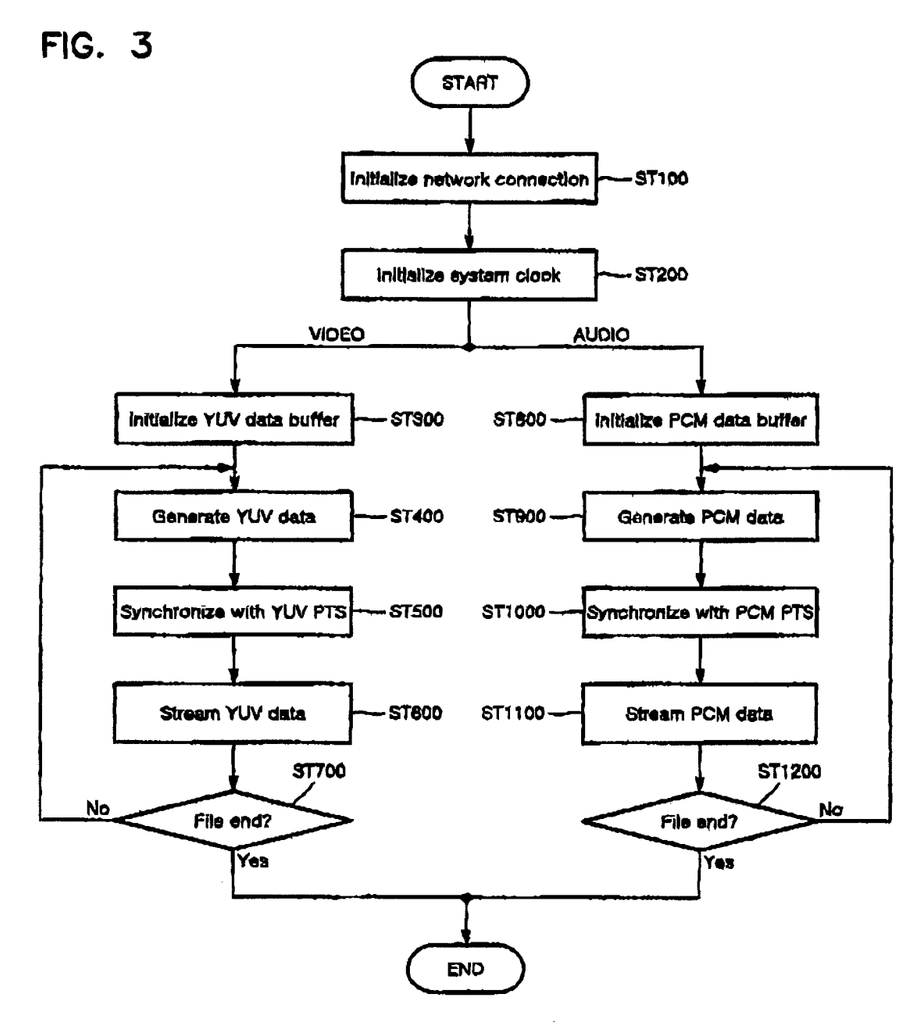
FIG. 3 is a flow diagram showing an MPEG-1 data streaming process according to the present invention.

FIG. 3 is a flow diagram showing the MPEG-1 data streaming procedure according to the present invention. In the figure, ST means a step. Referring to FIG. 3, network connection is initialized in a step ST100, and the system clock is initialized in a step ST200. Then, a YUV data buffer is initialized in a step ST300, and only video data among the MPEG-1 files read is converted into YUV data in a step ST400. The converted YUV data is synchronized with the YUV PTS generated by the system decoder in a step ST500, and the synchronized YUV data is transmitted to the network in a step ST600. In a step ST700, it is confirmed if the YUV data transmission is completed, and the procedure goes to step ST400 when there is YUV data to be transmitted but is finished when there is no YUV data. A PCM data buffer is initialized in a step ST800, and only audio data among the MPEG-1 files read is converted into PCM data in a step ST900. The converted PCM data is synchronized with the PCM PTS generated by the system decoder in a step ST1000, and the synchronized PCM data is transmitted to the network in a step ST1100. In a step ST1200, it is confirmed if the PCM data transmission is completed, and the procedure goes to step ST900 when there is the PCM data but is finished when there is no PCM data to be transmitted.

Although there has been described above that the video file among the MPEG-1 data is first converted into the intermediate data and then transmitted, the video file and audio file are respectively decoded by the video and audio decoders at the same time because the decoders are separately provided.

Figure 4:
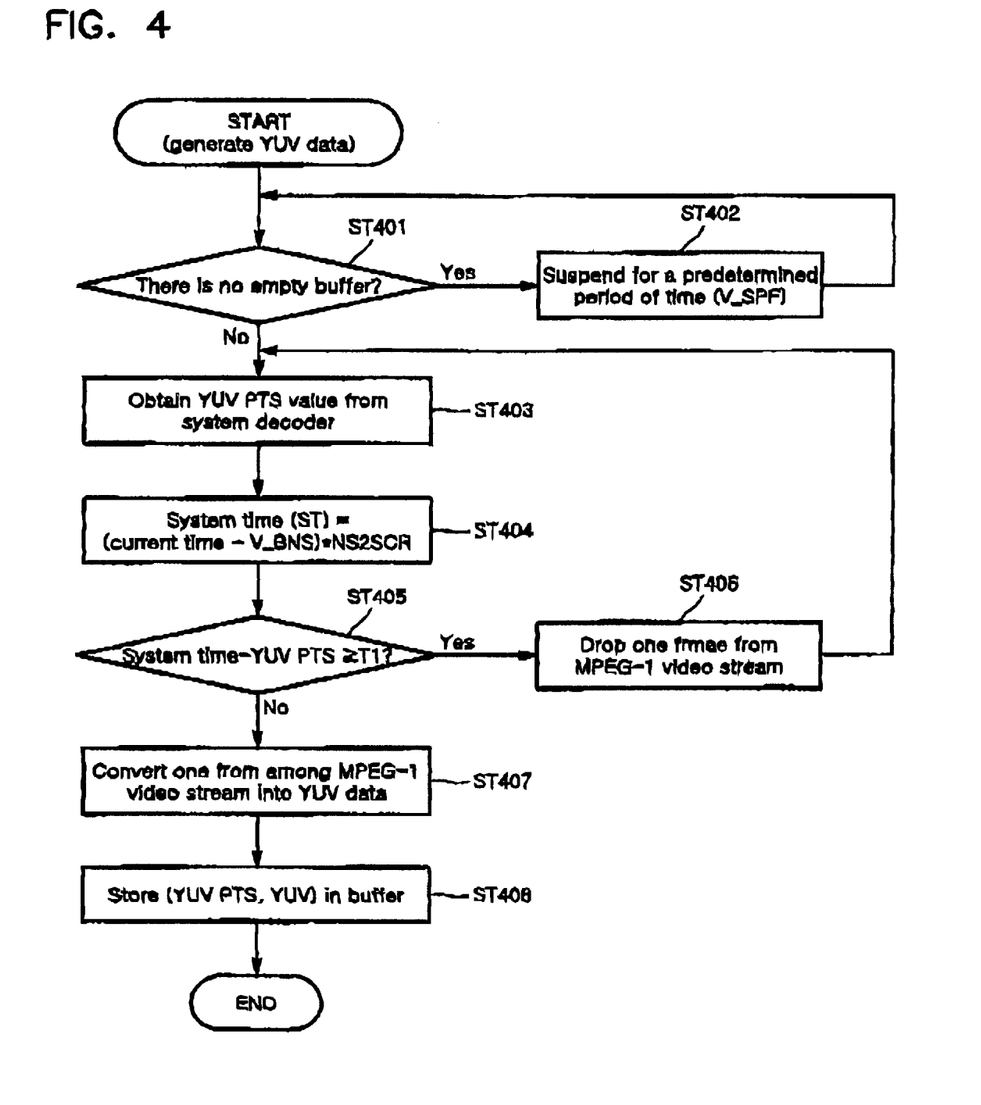
FIG. 4 is a flow diagram showing the YUV data generating routine of FIG. 3 in detail.

FIG. 4 is a flow diagram showing the YUV data generation routine ST400 of FIG. 3 in more detail. Referring to FIG. 4, the state of YUV packet buffer is checked (ST401), and, if there is no empty buffer, the procedure returns to the buffer state checking step ST401 while the conversion is suspended for time interval of one MPEG-1 frame (V_SPF) (ST402). On the other hand, if there is an empty buffer, the YUV PTS value is obtained from the system decoder (ST403) and then a value of system time ST is set (ST404). Here, the value of system time ST corresponds to (current time−V_BNS)*NS2SCR. Subsequently, the YUV PTS value is subtracted from the value of system time ST, and the result value is compared with a predetermined reference time (TI that is the time value for deciding if the next frame is transformed or dropped before the video intermediate data conversion) (ST405). As the result, when the result value is larger than or equal to reference value T1, one frame from the MPEG-1 video stream is dropped (ST406), returning to a step ST403. When it is smaller than reference value T1, one frame of video stream from the MPEG-1 video stream is converted into the YUV data (ST407), and this YUV data is stored at the buffer together with the YUV PTS (ST408). Through this procedure, the video file among the MPEG-1 files is converted into the YUV data as intermediate data.

Figure 5:
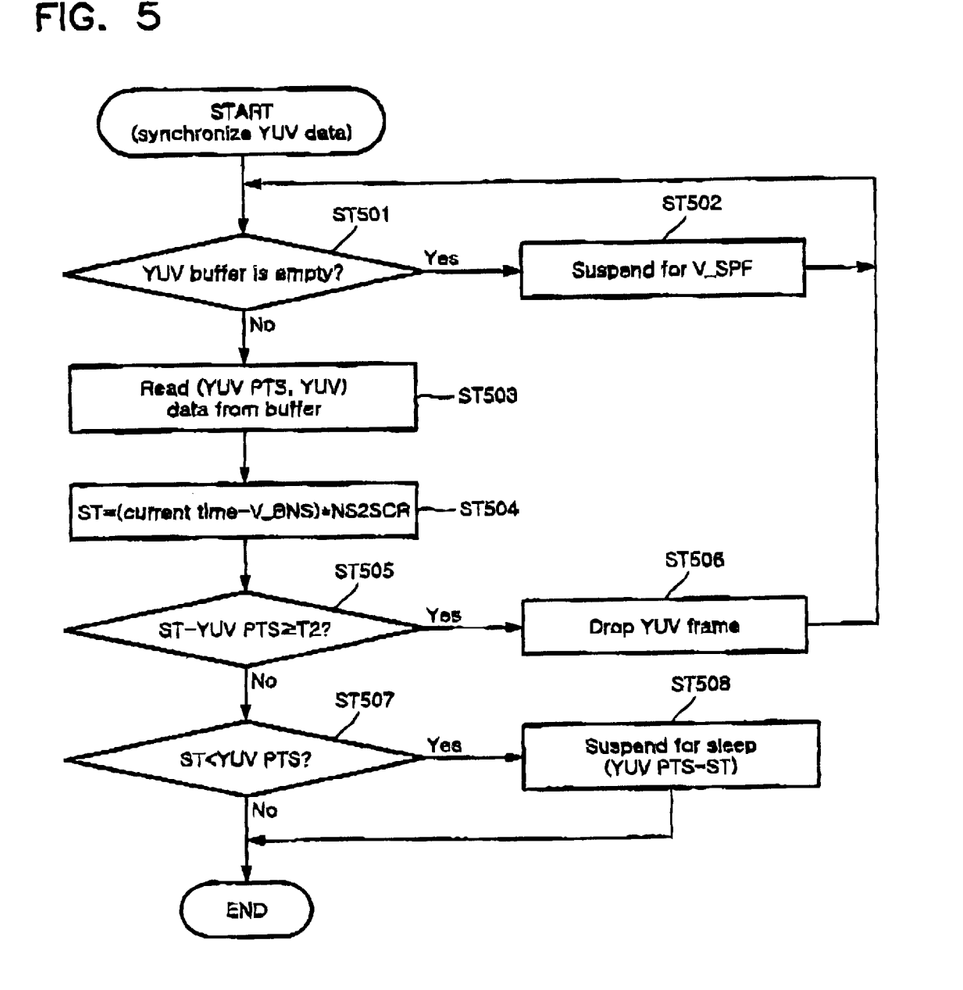
FIG. 5 is a flow diagram showing the YUV data synchronizing routine of FIG. 3 in detail.

FIG. 5 is a flow diagram showing the YUV data synchronizing routine of FIG. 3 in more detail. Referring to FIG. 5, upon checking the state of YUV packet buffer (ST501), when the buffer is empty, the synchronization is suspended for time interval of one MPEG-1 frame (V_SPF) and, after the lapse of the time, the procedure returns to buffer state checking step ST501 (ST502). On the other hand, if there is the YUV packet data in the YUV packet buffer, the YUV PTS and YUV data are read from the buffer (ST503), and then a value of system time ST is set (ST504). Here, the value of system time ST corresponds to (current time−V_BNS)*NS2SCR. Subsequently, the YUV PTS value is subtracted from the value of system time ST, and the result value is compared with a predetermined reference time (T2 that is the time value for deciding if the next frame is transformed or dropped before the video intermediate data streaming) (ST505). As the result, when the result value is larger than or equal to reference value T2, one YUV frame is dropped (ST506), returning to a step ST501. When it is smaller than reference value T2, the value of system time ST is compared with the YUV PTS value (ST507). When the value of system time ST is larger than or equal to the YUV PTS, the YUV data synchronizing routine is finished. In contrast, when the YUV PTS value is larger than the value of system time ST, the YUV data synchronizing procedure is suspended for a period time as much as a result obtained by subtracting the value of system 10 time ST from the YUV PTS (ST508). Thereafter, the procedure returns to the step of starting the YUV data synchronization.

Figure 6:
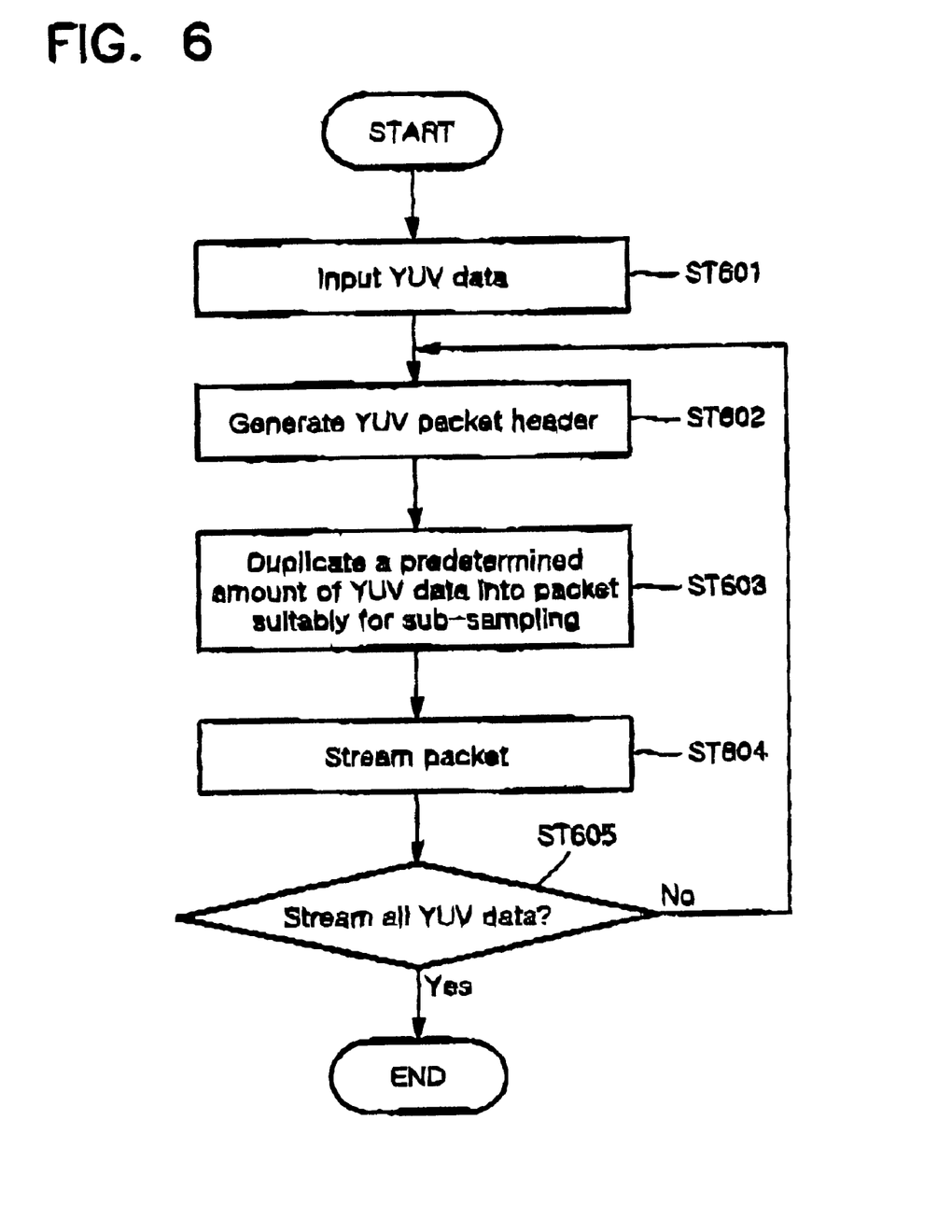
FIG. 6 is a flow diagram showing the YUV data streaming routine of FIG. 3 in detail.

FIG. 6 is a flow diagram showing the YUV data streaming routine (ST600) of FIG. 5 in detail. Referring to FIG. 6, upon inputting YUV data to be transmitted (ST601), the YUV packet header is generated (ST602). Then, a predetermined amount of the YUV data is duplicated into the packet suitably for sub-sampling (ST603). Subsequently, it is confirmed if there is more YUV data to be transmitted (ST605), and the procedure returns step ST602 when there is. When there is not, the YUV data streaming procedure is completed.

Figure 7:
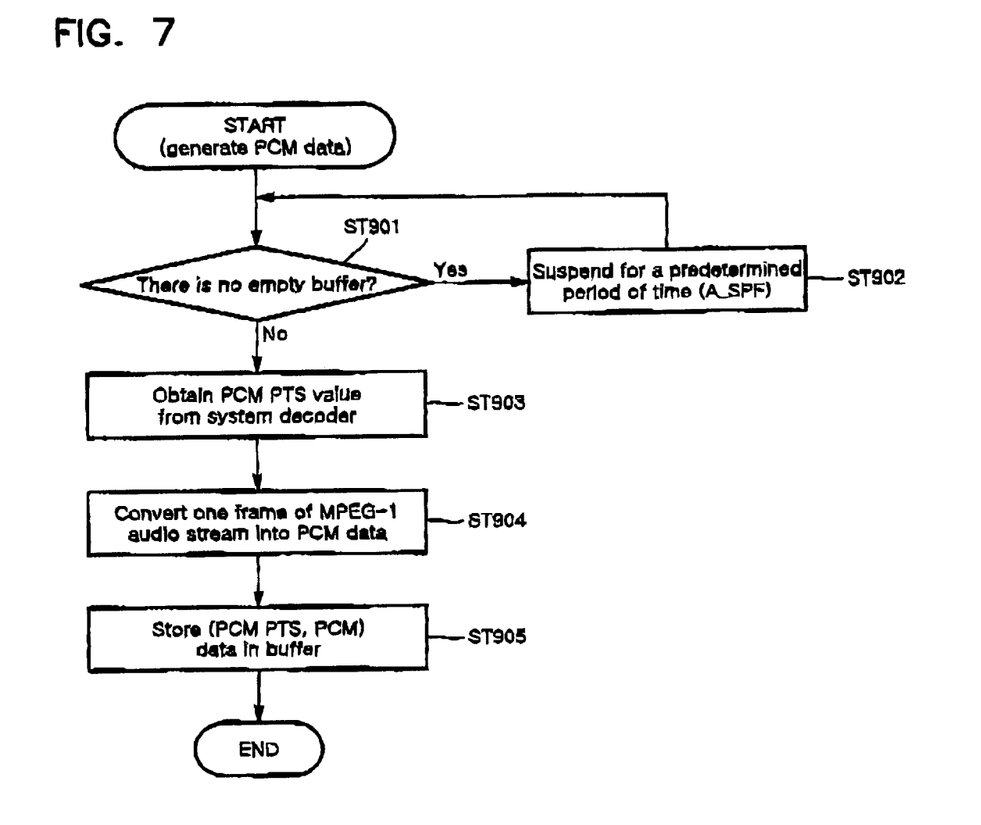
FIG. 7 is a flow diagram showing the PCM data generating routine of FIG. 3 in detail.

FIG. 7 is a flow diagram showing the PCM data generating routine (ST900) of FIG. 3 in detail. Referring to FIG. 7, the state of a buffer storing PCM data is checked (ST901). As a result, when there is no empty buffer, PCM conversion is suspended for a predetermined period time (time interval of one MPEG-1 frame: A_SPF) (ST902) and, after the lapse of this time, the procedure returns to buffer state checking step ST901. On the other hand, where there is an empty buffer, the PCM PTS value is obtained from the system decoder (ST903). Then, the audio stream of one frame from the MPEG-1 audio stream is converted into PCM data (ST904), and this converted PCM data and PCM PTS are temporality stored at the PCM data packet buffer (ST905). Through this procedure, the MPEG-1 audio file read is converted into the PCM data as audio intermediate data.

Figure 8:
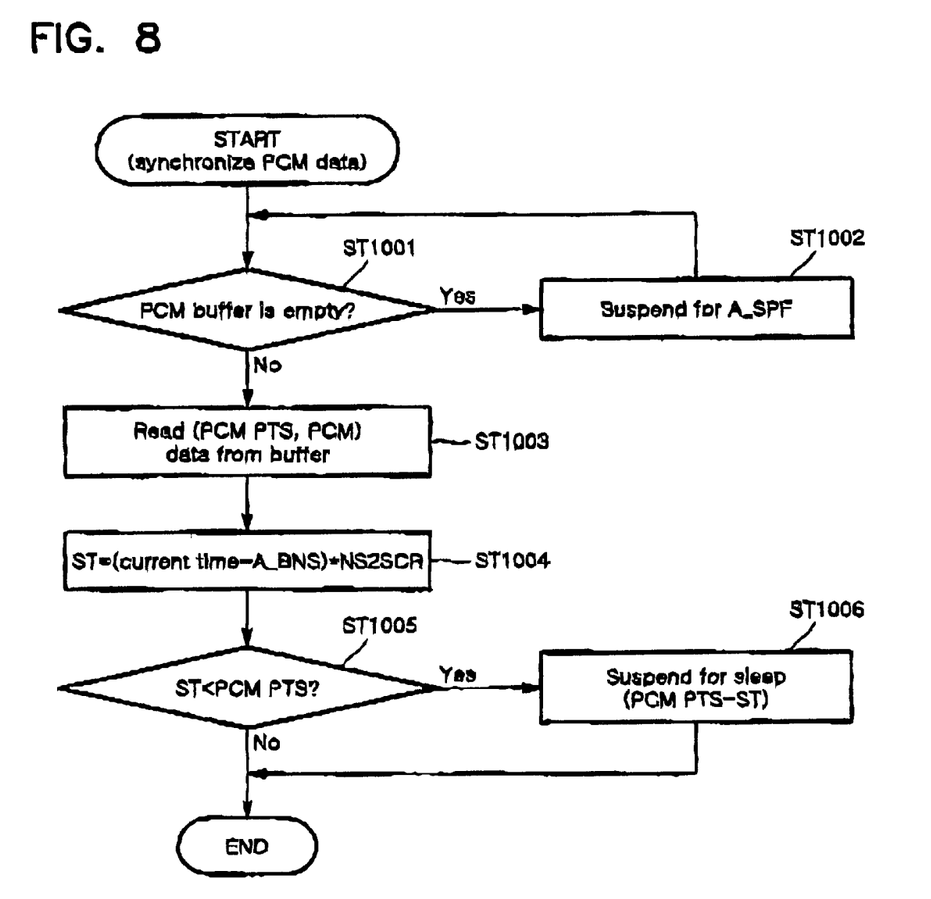
FIG. 8 is a flow diagram showing the PCM data synchronizing routine of FIG. 3 in detail.

FIG. 8 is a flow diagram showing the PCM data synchronizing routine (ST1000) of FIG. 3 in detail. Referring to FIG. 8, the state of PCM packet buffer is checked (ST1001). When the PCM packet buffer is empty, the synchronization is suspended for a period time corresponding to time interval of one MPEG-1 frame A_SPF) and, after the lapse of this time, the procedure returns to buffer state checking step (ST1001). On the other hand, when PCM packet data exits in the PCM packet buffer, the PCM PTS and PCM data are read from the buffer (ST1003). Thereafter, the value of system time ST is set (ST1004). Here, the value of system time ST corresponds to (current time−A_BNS)*NS2SCR. Subsequently, the value of system time ST is compared with the PCM PTS value and, when the value of system time ST is larger than or equal to the PCM PTS, the PCM data synchronizing routing is finished. In contrast, when the PCM PTS value is larger than the value of system time ST, the PCM data synchronizing routing is suspended for a period time corresponding to a result (PCM PTS−ST) obtained by subtracting the value of system time ST from the PCM PTS value (ST1006). Thereafter, the procedure returns to the step of starting the PCM data synchronizing routine.

Figure 9:
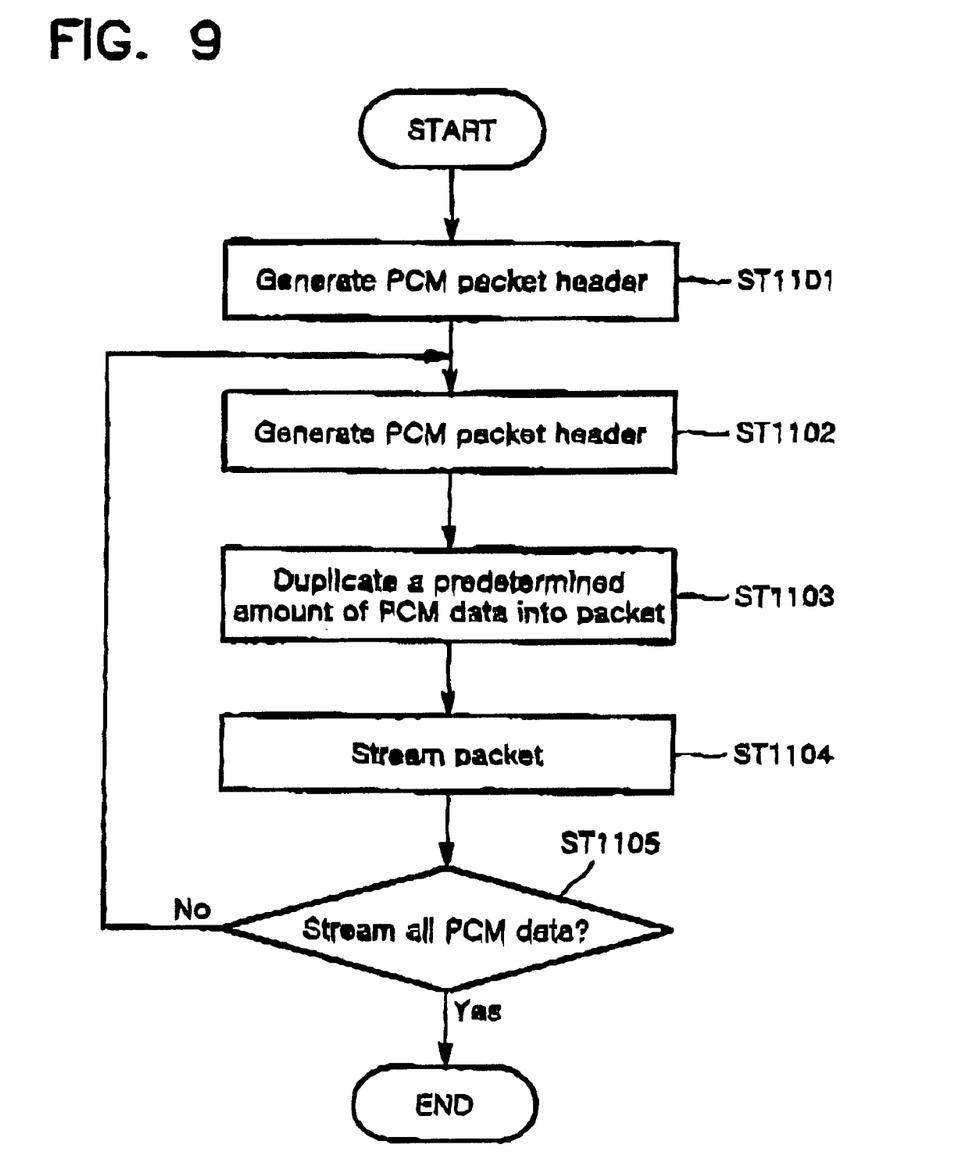
FIG. 9 is a flow diagram showing the PCM data streaming routine of FIG. 3 in detail.

FIG. 9 is a flow diagram showing the PCM data streaming routine (ST1100) in more detail. Referring to FIG. 9, upon inputting PCM data (ST1101), the PCM packet header is generated (ST1102) and a predetermined amount of the PCM data is duplicated into the packet (ST1103). Then, the packet into which the PCM data is duplicated is transmitted to the network (ST1104). Subsequently, It is confirmed if there is more PCM data to be transmitted (ST1105) and, when there is, the procedure returns to step ST1102. If there is not, the PCM data streaming routine is completed.

Figure 11:
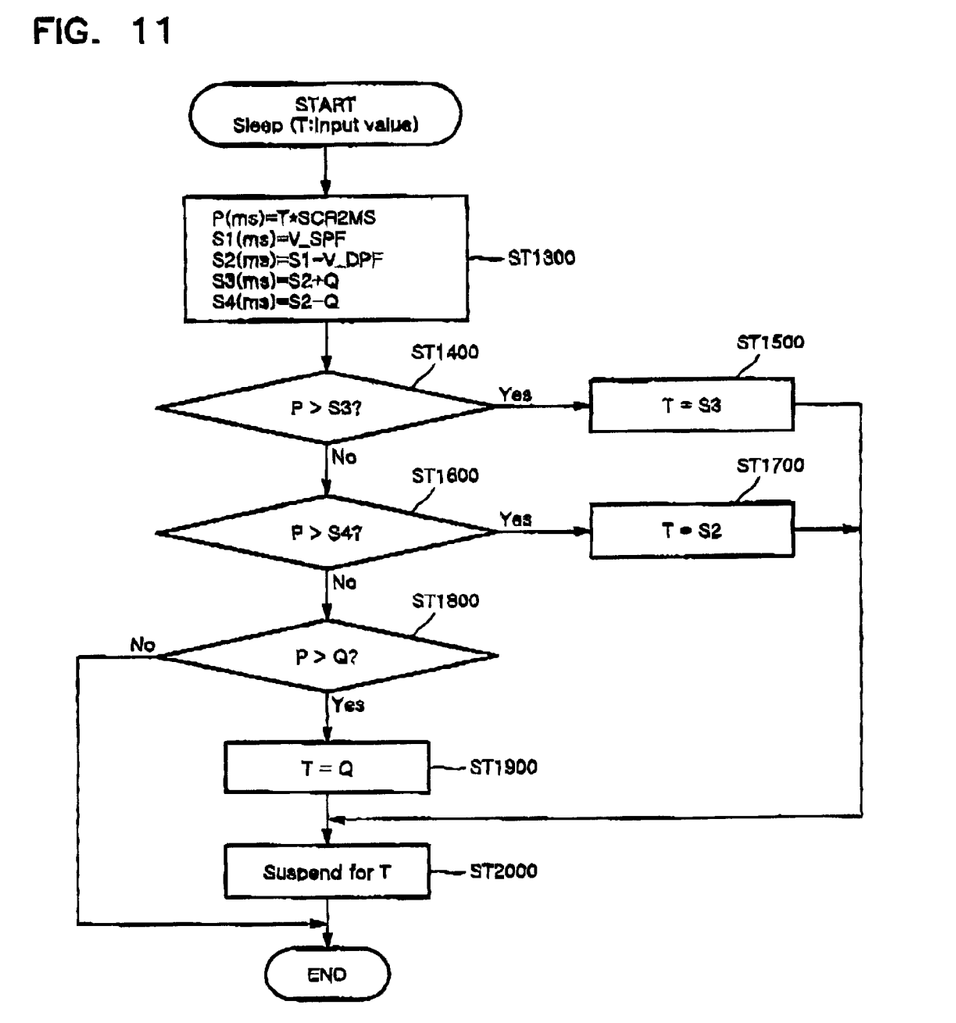
FIG. 11 is a flow diagram for explaining the sleep time in the present invention.

FIG. 11 is a flow diagram for explaining sleep time in the present invention. First of all, parameters are set in a step ST1300 in a manner that P(ms)=T*SCR2MS, S1(ms)=V_

SPF, S2(ms)=S1−V_DPF, S3(ms)=S2+Q, S4(ms)=S2−Q. Then, it is confirmed if P>S3 in a step ST1400 and, when it is, the procedure is suspended for the period of time S3 (ST1500). On the other hand, when it is not, it is confirmed if P>S4 (ST1600). As a result, when P>S4, the procedure is suspended for the period of time S2 (ST1700). If is not, it is confirmed if P>Q (ST1800) and, when it is, suspension time T is set to Q (ST1900) and the procedure is suspended for the period of time T (ST2000).

As described above, according to the present invention, the server converts the MPEG-1 file requested by the client into the YUV data and PCM data, synchronizes video data and audio data using the YUV PTS and PCM PTS and supplies them to the client. Accordingly, the client side does not requires an additional decoding device and synchronizing device, reducing the system construction cost, and being able to process the video/audio data in real time even with a simplified hardware configuration.

It will be apparent to those skilled in the art that various modifications and variations can be made in the MPEG-1 data streaming apparatus of the present invention without departing from the spirit or scope of the invention. Thus, it is intended that the present invention covers the modifications and variations of this invention provided they come within the scope of the appended claims and their equivalents.

What is claimed is:

1. An apparatus for streaming MPEG-1 data through a network connecting a server to a client, comprising:
   an MPEG-1 system stream decoder for decoding the system stream of an MPEG-1 file;
   a YUV data generator for converting a video stream transmitted from the MPEG-1 system stream decoder into YUV data as intermediate data;
   a PCM data generator for converting an audio stream transmitted from the MPEG-1 system stream decoder into PCM data; and
   an MPEG-1 intermediate data server for synchronizing the YUV data and PCM data, respectively generated by the YUV data generator and PCM data generator, with a YUV PTS and PCM PTS, obtained from the MPEG-1 system stream decoder, and a system clock, to transmit them to the client.

2. The MPEG-1 data streaming apparatus as claimed in claim 1, wherein the MPEG-1 intermediate data server comprises:
   the system clock for proving a system time ST;
   a synchronizing unit for controlling synchronization of the generated YUV packet and PCM packet with the system time ST generated by the system clock and the YUV PTS and PCM PTS obtained from the MPEG-1 system stream decoder;
   a YUV data transmitter for packetizing the YUV intermediate data generated by the YUV data generator, and synchronizing the YUV data under the control of the synchronizing unit, to transmit it; and
   a PCM data transmitter for packetizing the PCM data generated by the PCM data generator, and synchronizing the PCM data under the control of the synchronizing unit, to transmit it.

3. A method for streaming MPEG-1 data through a network connecting a server to a client, comprising the steps of:
   initializing the connection of the network, initializing a system clock, initializing a YUV data buffer and converting a video file among an MPEG-1 file read into YUV data, to generate YUV data;
   synchronizing the YUV data with a YUV PTS obtained from a system decoder and a system time ST generated by the system clock;
   streaming the synchronized YUV data to the network;
   converting an audio file among the MPEG-1 file read into PCM data, to generate PCM data;
   synchronizing the PCM data with a PCM PTS obtained from the system decoder and the system time ST generated by the system clock; and
   streaming the synchronized PCM data to the network.

4. The method as claimed in claim 3, wherein the YUV data generating step comprises the substeps of:
   checking the state of YUV packet buffer and, when there is no empty buffer, suspending the conversion of the video file for a time interval V_SPF of one MPEG-1 frame and then returning to the buffer state checking step;
   obtaining the YUV PTS value from the system decoder and then setting the system time value ST when there is an empty buffer;
   subtracting the YUV PTS value from the system time value ST and comparing the subtracted result with a reference time value T1 for deciding if, before conversion of video intermediate data, the next frame is transformed or dropped;
   dropping one frame from the MPEG-1 video stream when the result is larger than or equal to the reference time value T1; and
   converting the video stream of one frame among the MPEG-1 video stream into the YUV data, and storing this YUV data in the buffer together with the YUV PTS when the result is smaller than the reference time value T1.

5. The method as claimed in claim 3, wherein the YUV data synchronizing step comprises the substeps of:
   checking the state of YUV packet buffer and, when the YUV packet buffer is empty, suspending the synchronization for a time interval V_SPF of one MPEG-1 frame, and then, after the lapse of the time, returning to the buffer state checking step;
   reading YUV PTS and YUV data from the buffer when the YUV packet data exists in the YUV packet buffer;
   setting the system time value ST;
   subtracting the YUV PTS value from the system time value ST, and comparing the subtracted result with a reference time value T2 for deciding if, before streaming of video intermediate data, the next frame is transmitted or dropped;
   dropping one YUV frame when the result is larger than or identical to the reference time T2;
   comparing the system time value ST with the YUV PTS value when the result is smaller than the reference time T2; and
   finishing the YUV data synchronizing step when the system time value ST is larger than or equal to the YUV PTS, and suspending the YUV data synchronizing step for a period of time corresponding to a result obtained by subtracting the system time value ST from the YUV PTS when the YUV PTS value is larger than the system time value ST.

6. The method as claimed in claim 3, wherein the YUV data streaming step comprises the substeps of:

when the YUV data is inputted, generating a YUV packet header;

duplicating a amount of the YUV data into the packet, suitably for sub-sampling; and streaming the packet into which the YUV data is duplicated to the network.

7. The method as claimed in claim 3, wherein the PCM data generating step comprises the substeps of:

checking the stage of a buffer storing the PCM data and, when there is no empty buffer, suspending the PCM conversion for a time interval A_SPF of one MPEG-1 frame;

obtaining the PCM PTS value from the system decoder when there is an empty buffer;

converting an audio stream of one frame from the MPEG-1 audio stream into the PCM data; and temporarily storing the PCM data and PCM PTS in the PCM data packet buffer.

8. The method as claimed in claim 3, wherein the PCM data synchronizing step comprises the substeps of:

checking the state of PCM packet buffer, suspending the synchronization for time interval A_SPF of one MPEG-1 frame when the PCM packet buffer is empty, and after the lapse of the time returning to the buffer state checking step;

reading the PCM PTS and PCM data from the buffer when PCM packet data exists in the PCM packet buffer;

setting the system time value ST;

comparing the system time value ST with the PCM PTS value and, when the system time value ST is larger than or equal to the PCM PTS value, finishing the PCM data synchronizing step; and suspending the PCM data synchronizing step for a period of time corresponding to a result obtained by subtracting the system time value ST from the PCM PTS value when the PCM PTS value is larger than the system time value ST.

9. The method as claimed in claim 3, wherein the PCM data streaming step comprises the substeps of:

generating a PCM packet header;

duplicating a predetermined amount of the PCM data into the packet; and streaming the packet into which the PCM data is duplicated to the network.

* * * * *